May 26, 1942. J. N. WARNER 2,284,184
ROTARY DIESEL ENGINE
Filed Dec. 11, 1939 6 Sheets-Sheet 1
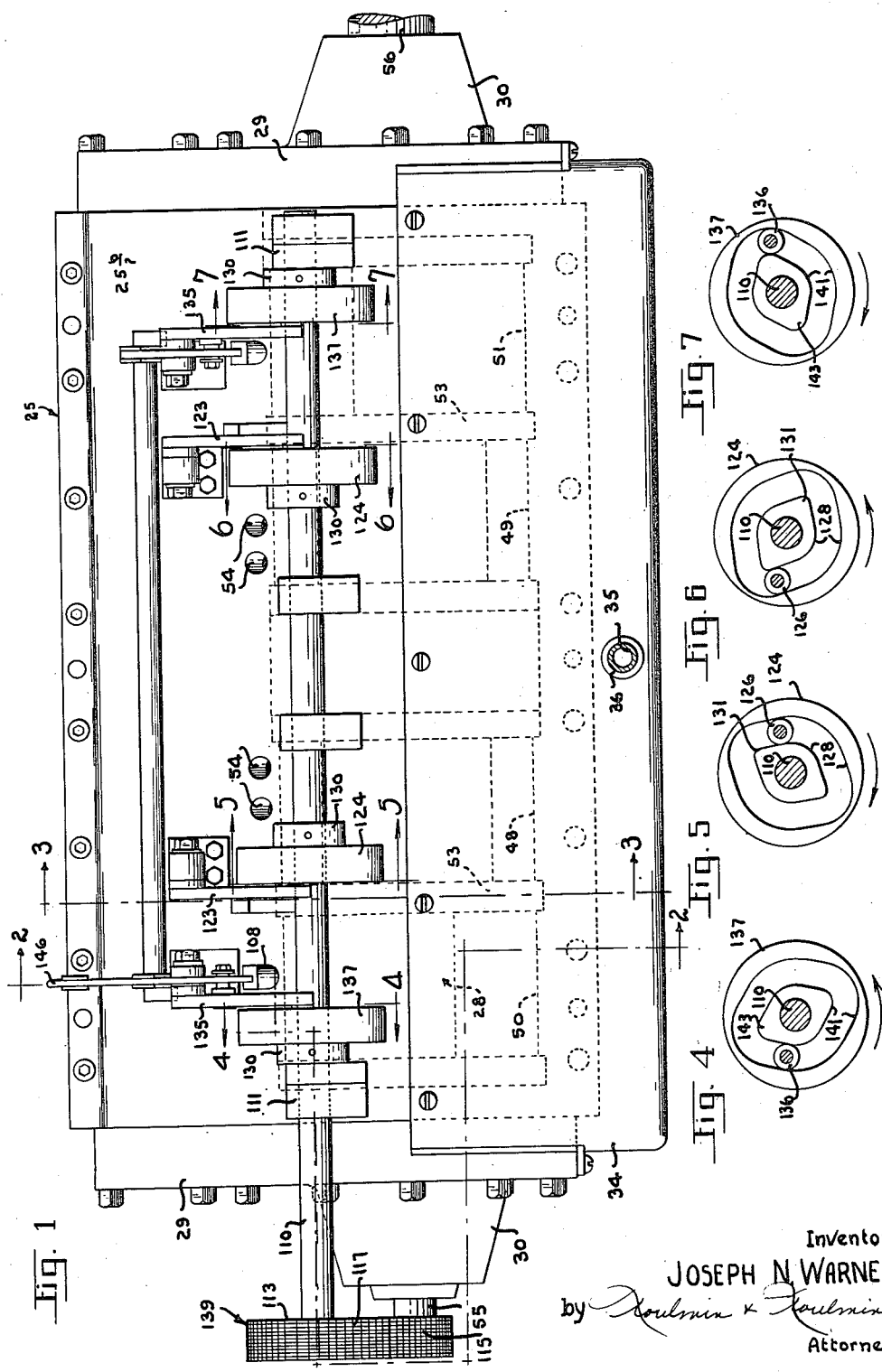
Inventor
JOSEPH N. WARNER
by Toulmin & Toulmin
Attorneys

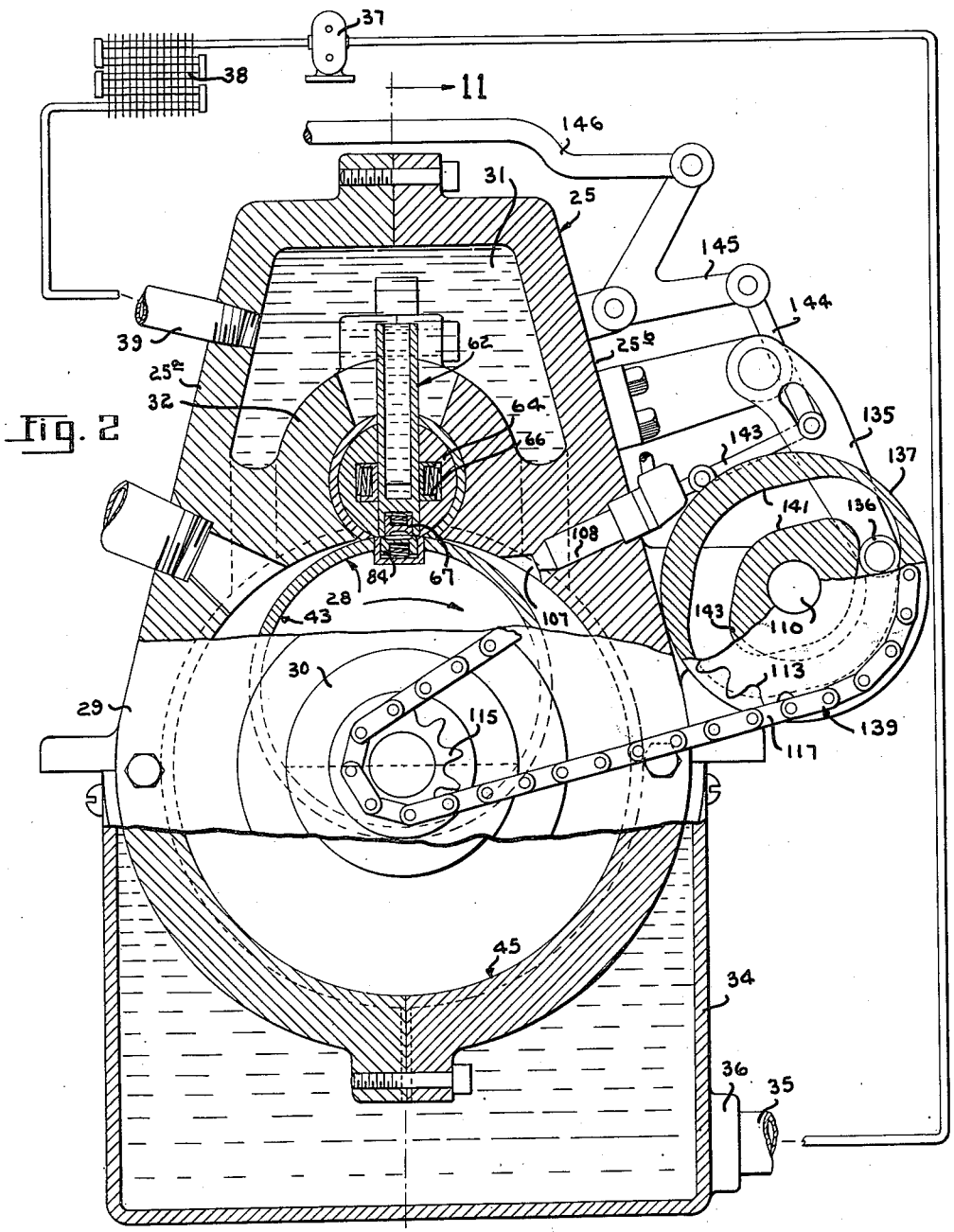

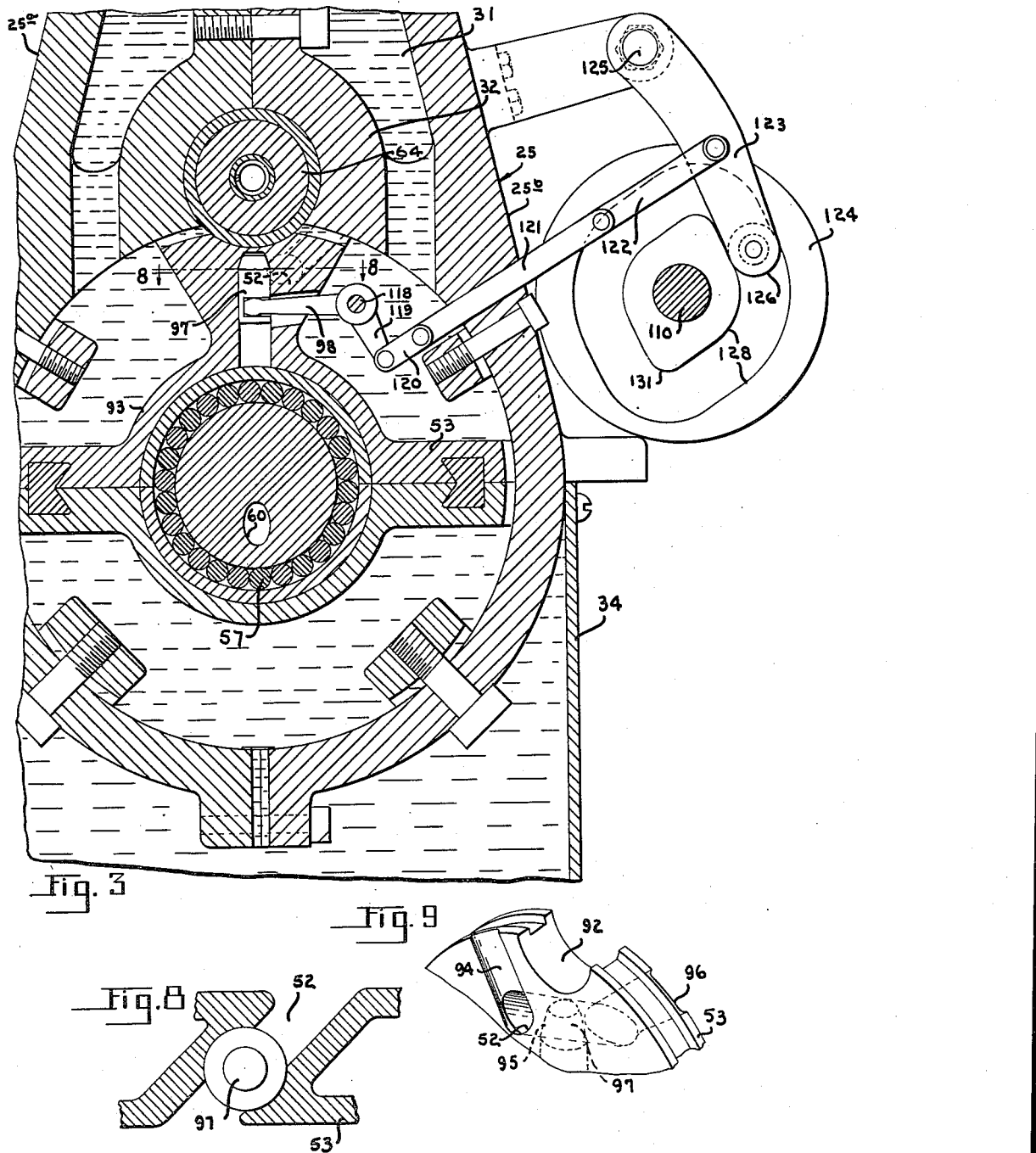

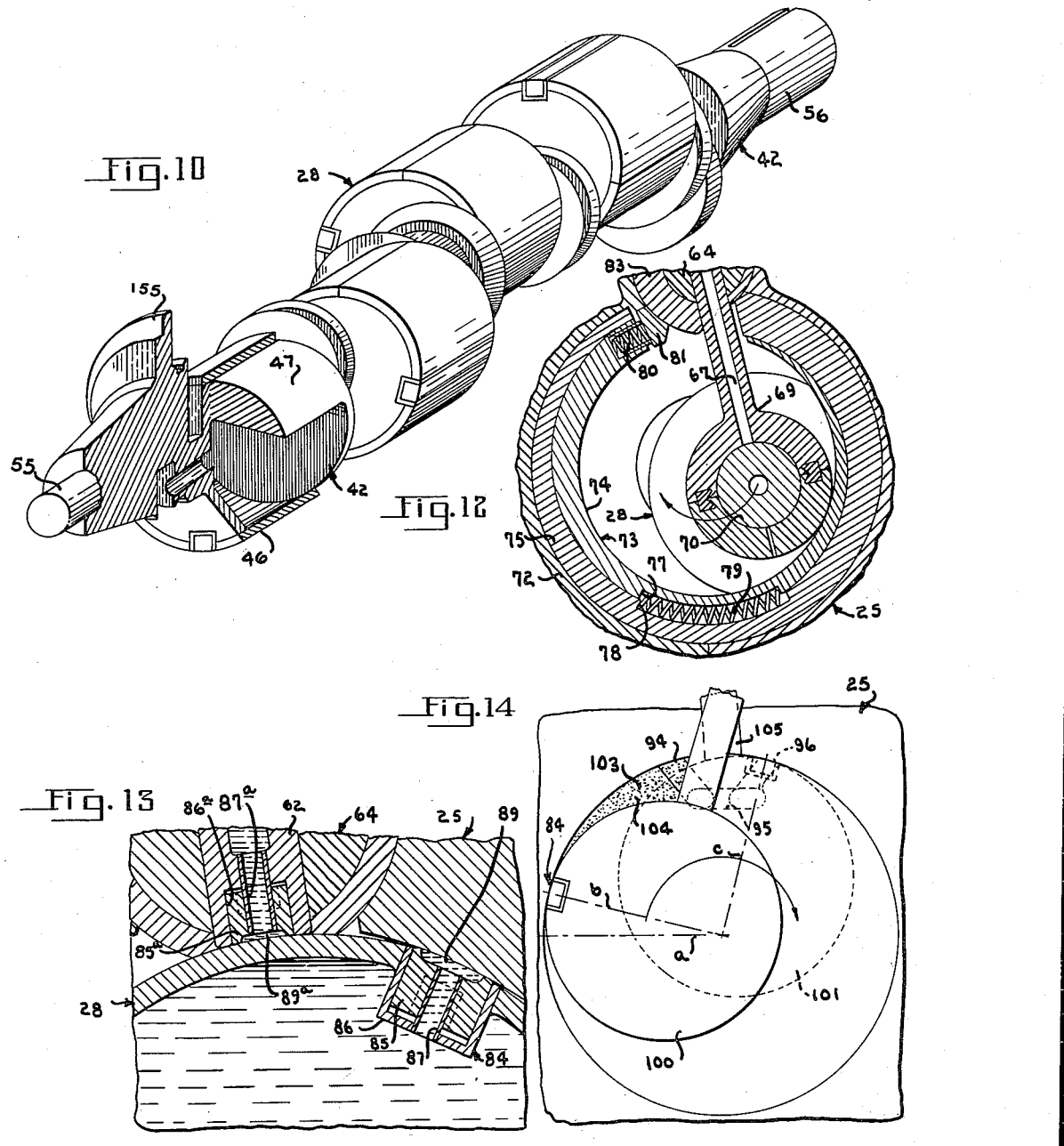

May 26, 1942.   J. N. WARNER   2,284,184
ROTARY DIESEL ENGINE
Filed Dec. 11, 1939   6 Sheets-Sheet 5
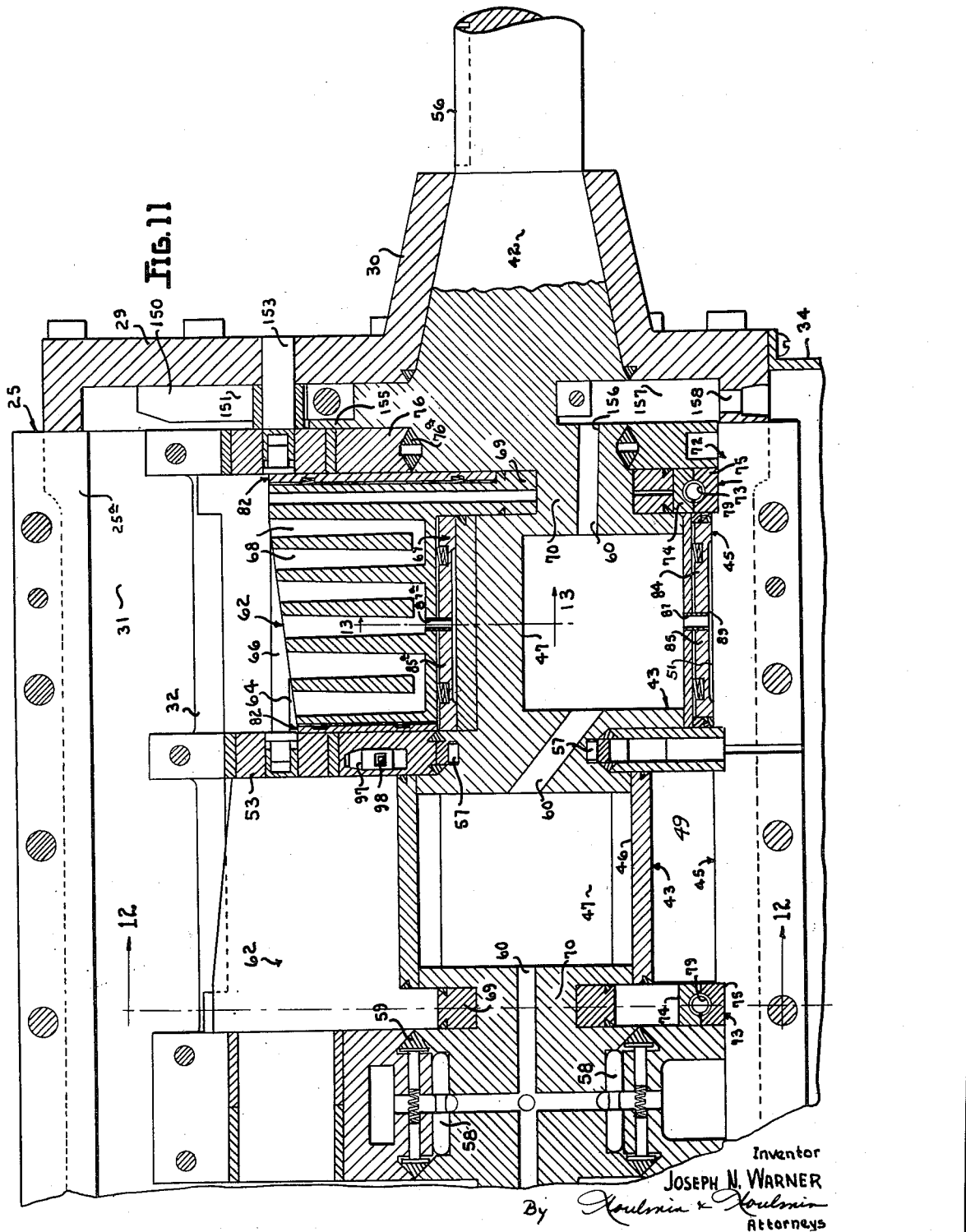
Inventor
JOSEPH N. WARNER
By Houlmin & Houlmin
Attorneys

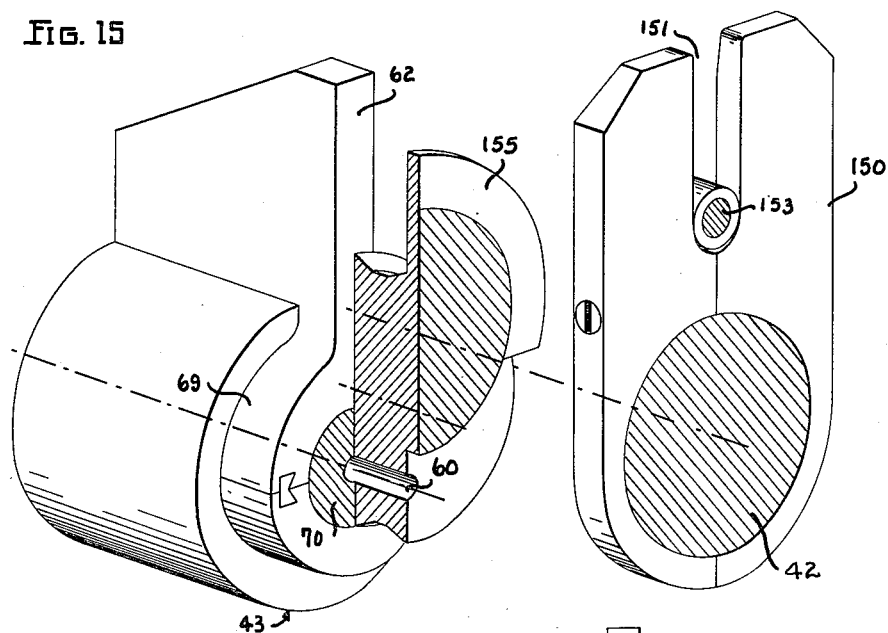
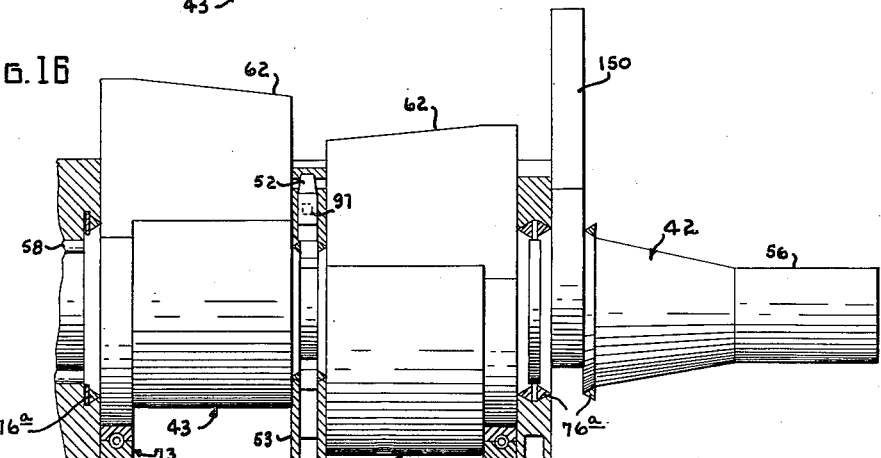
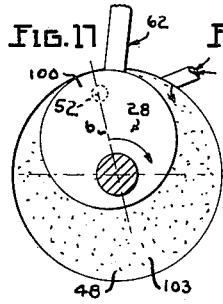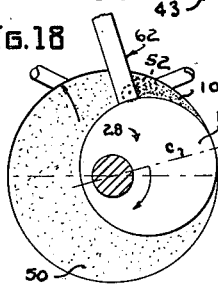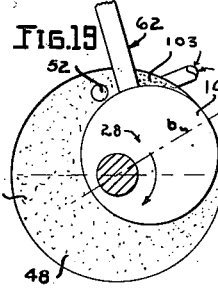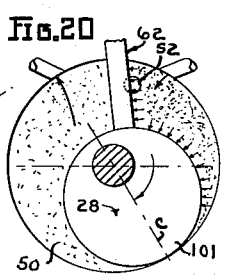

Patented May 26, 1942

2,284,184

UNITED STATES PATENT OFFICE 2,284,184

ROTARY DIESEL ENGINE

Joseph N. Warner, Dearborn, Mich.

Application December 11, 1939, Serial No. 308,585

19 Claims. (Cl. 123—8)

This invention relates to internal combustion engines and more particularly to a two-stroke cycle Diesel engine of the rotary type construction having cylinders coaxial with the crankshaft.

It is an object of this invention to provide a compression-ignition rotary engine which is adapted to be utilized as a power plant for aircraft, automobile, locomotive and marine devices.

Another object is to provide an internal combustion engine of the type described wherein the air compressor and power cylinders are disposed in line to provide a power unit offering low frontal wind resistance.

Another object is to devise a compression-ignition prime mover which can be readily installed in the conventional type locomotive, automobile and airplane mechanism and provide a more efficient propulsion means than heretofore realized.

Another object is to provide in an internal combustion engine of the Diesel type a rotor mechanism with air compressor and power cylinders having a simple and effective intake and exhaust valve system for admitting and discharging compressed air to the power cylinders which is free from speed limitations within the range of engine speed desired.

Another object is to provide an internal combustion engine comprising a rotor mechanism and associated partitioning abutments which is constructed so as to form a balanced rotary engine mechanism.

Another object is to provide a rotary Diesel engine having air compressing cylinder means and power cylinder mechanism arranged in line and operable to rotate a crankshaft at approximately 6000 R. P. M.

Another object is to devise an internal combustion engine of the rotor and sliding abutment type wherein the rotating parts are counterbalanced in such a manner that the abutment and rotor assembly are balanced in all positions of rotation.

Another object is to provide a rotary compression-ignition combustion engine having a crankshaft rotor with air compressor and power cylinders associated therewith wherein certain of the cylinders are adapted to compress air to a high degree and discharge it into adjacent power cylinders for igniting and burning the same to cause rotation of the crankshaft rotor and associated mechanism.

Still another object is to devise a rotary internal combustion engine wherein the parts are cooled and lubricated by lubricating oil which is circulated under pressure through the walls of the engine and moving parts.

Another object is to provide an internal combustion engine of the type described wherein the crankshaft is driven by a two-stroke cycle rotary Diesel mechanism having coaxially aligned power and air compressor cylinders and arranged so that each of the power cylinders is supplied with compressed air by air compressor mechanism driven by said crankshaft.

Another object of this invention is to provide a rotary engine of this nature wherein liquid coolant means is utilized for cooling the rotor and casing heads by supplying the coolant externally of the casing and adjacent the power cylinder and air compressing chambers and circulating the same to and from a radiator so as to effectively cool the engine during operation.

Referring to the drawings which form a part of this specification:

Figure 1 is an elevation view illustrating a rotary Diesel engine constructed according to this invention;

Figure 2 is a sectional view taken through the power compression-ignition chamber of the engine and made substantially on the line 2—2 of Figure 1;

Figure 3 is a vertical sectional view through the crankshaft bearing, air compressor valve and showing the associated valve actuating mechanism;

Figures 4, 5, 6 and 7 are fragmentary detail views taken substantially on the lines 4—4, 5—5, 6—6 and 7—7, respectively, on Figure 1 showing the shape and angular position of the cams employed in operating the air compressor release and fuel injection control valves;

Figure 8 is a fragmentary detail view taken on the line 8—8 of Figure 3 and looking in the direction of the arrows;

Figure 9 is a fragmentary perspective view of the wall section between the compressor cylinder and power cylinder showing the position and shape of the air passageway therethrough;

Figure 10 is a perspective view of the rotor and crankshaft mechanism;

Figure 11 is a sectional view taken through the rotor along the axis of the crankshaft and showing the eccentrically mounted drum-like pistons and associated abutment means. This view is taken substantially on the line 11—11 of Figure 2;

Figure 12 is a fragmentary sectional view taken substantially on the line 12—12 of Figure 11 and showing the abutment and associated sealing members adjacent the wall of the cylinder;

Figure 13 is a fragmentary detail sectional view taken substantially on the line 13—13 of Figure 11 illustrating the arrangement for fluid sealing the drum-like piston rotor members to the cylinder wall and the means for sealing the abutment to the rotor;

Figure 14 is a diagrammatic view illustrating the relative position of the air compressor piston rotor and power cylinder piston rotor members the instant before air is discharged from the compressor cylinder into the power cylinder chamber;

Figure 15 is an exploded perspective view of the abutment, counterbalance, and spacer mechanism adjacent the outer abutment members and showing the means for permitting circulation of the oil through the rotor and associated mechanism;

Figure 16 is a vertical sectional view taken through the rotor which is partly broken away showing the rotor and abutment assembly for the compression and power cylinders. The part broken away is of substantially the same construction;

Figures 17, 18, 19 and 20 are diagrammatic views illustrating the relative positions of the air compressor piston rotor member and the power piston rotor means during the operation of the engine.

In general, the rotary Diesel engine of this invention consists of a casing provided with four coaxial cylinders having a centrally arranged crankshaft rotor mechanism provided with eccentric drum-like pistons which are adapted to rotate within the cylinder adjacent thereto. Two of the cylinders are arranged to operate as air compressor members and the other two function as explosive or power cylinders. Sliding abutments are mounted radially of the rotor mechanism and one abutment is provided for each piston so as to form a partition between the wall of the piston and the wall of the cylinder in order that fuel when injected and ignited will have a barrier against which to work so as to bring about rotation of the crankshaft and rotor mechanism. Air or fuel is drawn into one cylinder and after it is compressed to a high degree and while at a high temperature is passed into an adjacent cylinder where it is ignited by injection of fuel thereinto.

Injection of the fuel is timed by a suitable cam actuated mechanism which is driven by the crankshaft. Single rotation of the rotor functions to permit the introduction of fuel and its ignition while simultaneously exhausting through port openings the previously burned gases. This type of combustion engine is adapted to function as a prime mover for motors, pumps, compressors or other mechanism requiring prime movers.

Motor block assembly

Referring to the drawings in detail, particularly Figures 1, 2 and 3, the rotary engine illustrated comprises a motor block or casing generally designated 25 which is conveniently made in two halves 25a and 25b and bolted together, as shown in Figure 2. The lower enlarged portion of the block is adapted to receive a crankshaft rotor member generally referred to by reference character 28. Casing heads 29 comprise the bearing portions 30 for rotatably supporting the rotor crankshaft ends. The casing head members are bolted to the ends of the motor block 25 to provide a substantially fluid tight casing, as shown in Figure 1.

Rotor and abutment assembly

The rotor casing comprises an upper oil or liquid coolant chamber 31, through which the cooling medium such as oil is circulated, an abutment rocker bearing portion 32 and the cylindrical bore. Fitted to the bottom part of the casing 25 is an oil pan or receptacle 34 which is adapted to be filled with oil providing a cooling medium for the lower half of the cylinder block.

Oil is forced to circulate under pressure throughout the engine parts to prevent the engine from overheating during operation. To provide for this, suitable conduit means 35 is connected to the outlet 36 positioned near the bottom of the oil pan 34, as shown in Figure 1, and the oil is forced by means of pump 37 through a radiator or cooling means 38 and is returned to the oil chamber 31, in the upper part of the motor block, by means of the pipe connection 39.

The rotor 28 comprises a crankshaft 42 having eccentrically mounted drum shaped pistons generally designated 43 mounted thereon, which are fitted to rotate with the crankshaft within the coaxially arranged cylinders 45. The piston members are preferably integrally joined to the crankshaft as shown in Figure 10, and are made of hollow casing portion 46 and provided with counterbalancing means 47 which are positioned within the drum-like casing so as to provide a perfectly counterbalanced rotor mechanism. Two compression cylinders 48 and 49 and two power cylinders 50 and 51 are provided which are preferably arranged as shown in Figure 1 so that the compression cylinders will be in between the two power cylinders which are disposed at the opposite ends of the rotor crankshaft. The power cylinder 51 is connected to the compression cylinder 49 and similarly the cylinder 50 is connected with the compression cylinder 48 by means of valve control passageways 52 in the stationary walls 53 between the power cylinder and compression cylinder chambers. Air inlet ports 54 are provided in the outer walls of the cylinder block as shown in Figure 1, and communicate with the air compressing cylinders to provide an air inlet.

In the engine illustrated in the drawings a four-cylinder motor unit is shown but it will be understood that any suitable number of cylinders comprising compressor and power chamber members may be provided in accordance with the power required to be delivered by the engine.

When the rotor member 28 is positioned in the cylindrical portion the ends of the crankshaft are extended outward through the central apertures in the casing head bearing end bosses 30, as shown at 55 and 56 of Figure 1. The rotor is suitably mounted to rotate on the roller bearings 57 adjacent the ends of the rotor and the intermediate bearing 58 disposed between the air compressor cylinders 48 and 49. The intermediate roller bearing comprises the spaced roller members 58, and spring pressed packing ring seal members 59 are provided for sealing the bearing against the passage of oil from the bearing into the adjacent compressor and power cylinders of the motor. Interconnecting oil passageways 60 are provided throughout the length of the rotor to permit the passage of oil to the bearings and interior working parts of the engine.

An abutment generally designated 62 is arranged to reciprocate in the rocker bearing 64 positioned in the partition 32 of the motor block, as shown in Figure 2. Each compression and power cylinder is provided with an abutment member 62 which serves to partition the cylinder chamber and provide a varying sized chamber during rotation of the rotor pistons. The abutment rocker bearing 64 is provided with an oil seal member 66 and an oil shoe seal 67 adjacent the periphery of the pistons, as shown in Figure 2, so as to hydraulically fluid seal the rocker and abutment members and thoroughly lubricate the parts. Oil passageways 68 are provided in the abutment members 62 through which oil is circulated to cool the member. As shown in Figures 11 and 12 the abutment 62 comprises an extension 69 for coupling the abutment to the eccentric crankshaft portion 70 of the rotor so as to carry the abutment around upon rotation of the rotor.

For sealing the abutment crank arm member 69 to the outer wall 72 of the motor block there is provided a packing ring member generally designated 73. This ring is constructed of two concentric ring members 74 and 75 which are adapted to slide over each other. Opposed cutaway portions 77 and 78 are provided in the ring members 74 and 75 respectively, in which is positioned a coil spring 79 for yieldably maintaining the ring parts 74 and 75 tightly in place. The inner ring 74 is forced in a counterclockwise direction by means of the compression spring 80 which is arranged to move relative to the abutting end portion 81 adjacent the abutment rocker bearing assembly 64. A similar oil sealing shoe 82 is used to seal the abutment 62 to the wall 76. Additional rotor packing rings 76a are utilized for sealing the rotor as shown in Figure 11.

For taking up the opening between the rocker abutment bearing 64 and the member 81 during the rotation of the rotor and lowering of the abutment, as shown in Figure 12, there is provided an enlarged circular sealing ring portion 83, as shown in Figure 12. The crank pin portion 69 of the abutment is arranged to slidably contact the inner ring 74 during reciprocation of the rotor.

The hydraulic shoe sealing members 84 at the outer contacting periphery wall of the pistons, as shown in Figure 13, comprise a spring balanced shoe 85 which is adapted to reciprocate in the chamber 86 so as to be moved outward against the walls of the cylinder. A central sleeve 87 extends through the shoe 85 and chamber 86 allowing oil to flow into an enlarged shallow cutaway portion 89 at the opposite end of the shoe 85. In this manner oil under pressure in the interior of the piston drum is utilized in sealing the peripheral contacting surface of the piston drum to the cylinder wall as shown in Figure 13. A similarly constructed sealing means 67 is provided for the abutment 62 as shown in Figure 13, wherein the spring balanced shoe 85a is adapted to reciprocate in the chamber 86a of the abutment 62. A sleeve 87a acts as an oil passageway to the outer cutaway portion 89a.

*Valve mechanism*

For admitting compressed air from the compressor cylinders to the adjacent power cylinders there is provided an air passageway 52 through the stationary walls 53 intermediate the compressor chambers and power cylinders, as shown in Figure 3. The upper portion of the stationary wall 53 comprises a semi-circular groove 92 which is adapted to receive the abutment rocker assembly 64. The central hub portion 93 comprises a roller bearing 57. In order to provide for passage of compressed air from the compressor cylinder during reciprocation of the piston drum members a groove-like passageway is cut along the inner stationary wall 53 and opposite side wall which is in communication with the power cylinder side as shown in Figure 9. This passageway comprises a portion 94, 95 and 96. Within the interconnecting air passageway 95 is positioned the valve 97 which is adapted to be reciprocated by the valve actuating levers 98 so as to open and close the passageway at the proper time.

As illustrated in Figure 14, the opening and closing of the compressor valve 97 to permit passage of compressed air to the power cylinders is effected when the compressor piston 100 is approaching its uppermost position and the maximum compression of the air has been reached. The opening of the valve occurs when the compressor piston 100 is about fifteen degrees from the center line a. It will be understood, of course, that this depends upon the degree of air compression desired. In the construction of the rotor the power pistons 101 are placed ninety degrees in advance of the compressor pistons. This angular positioning of the pistons is illustrated in Figure 14 by the lines b and c. As shown, the air 103 is compressed in the compartment 104 and at the moment is ready to be passed from the compression chamber 104 to the power chamber formed between the abutment 105 of the power chamber and the power piston 101 as the piston moves around in a clockwise direction.

Immediately after the compressed air is passed into the power chamber of the cylinder the injection of fuel takes place through the fuel valve opening 107, which is controlled by a cam actuated nozzle valve 108. Injection of fuel takes place through a longer angular movement of the piston than the opening of the air valve. Preferably initial injection of fuel is started when the piston of the power cylinder is about sixty degrees from the perpendicular and ends when the piston is moved to an angular position of about one hundred and fifty degrees past the top perpendicular position, as shown in Figures 17 to 20. Although injection of the fuel starts when the rotor has just passed the top dead center position, maximum firing does not occur until the piston has moved beyond the dead center position.

*Valve actuating mechanism*

The rotary engine of this invention is adapted to rotate at about 6000 R. P. M. and on account of this high speed positive action cams are preferably used for actuating the air compressor and fuel valves. As illustrated in Figures 1, 2 and 3, actuation of the valve is effected by means of the cam mechanism. This mechanism comprises a shaft 110 which is suitably mounted for rotation in the bearing members 111 of the motor block 25, as shown in Figure 1. At one end of the shaft 110 there is provided a pinion gear 113 which is arranged to be driven by the gear 115 on the crankshaft extension 55. An interconnecting belt or chain 117 drivingly connects the pinion members 113 and 115.

For operating the valve 97 for controlling the passage of air from the compressor to the power cylinder and fuel injection nozzle valve 108, there is arranged a cam actuated lever mechanism. For actuating the valve 97 the rod 98 is pivoted as at 118 and the extension 119 forms a bell crank arrangement which is actuated through the rods 120, 121, 122 and 123 and cam 124. The member 123 is pivotally connected to the motor casing as at 125 and is provided with a roller 126 on one end which engages the cam surface 128 on the cam member 124, so as to reciprocate the valve actuating rod 98 to open and close the valve at the proper time.

The cam members 124 are suitably fixed to the cam shaft 110 by means of the collars 130. Cam surface 128 for operating the air compressor valve 97 comprises sharp radius of curvature sections 131 to provide sharp opening and closing of the air valve, since the opening of the air valve is maintained a much shorter time than the injection fuel valve.

Similar cam actuated mechanism is provided for actuating the injection fuel valve 108. In this instance the injection valve 108 is automatically opened and closed by means of the link 135 which is actuated by the roller and cam assembly 136 and 137 respectively. The cam 137 is suitably driven by sprocket and chain means, generally designated 139, and comprises the members 113, 115 and chain 117 which is driven by the crankshaft rotor, as shown in Figure 2. The cam surface 141 in this instance is of similar shape as the air valve controlling cam surface 128 but greater radius of curvature is provided at the valve actuating surfaces 143 to provide the proper length of time for injecting the fuel before cutting off the same. For varying the amount of fuel injected there is provided an adjustable rod 143 and suitable actuating linkage lever mechanism 144, 145 and 146. The compressor discharge and fuel injection valves are operated by the cams 124 and 137 which are rotated at one-half the rotor speed.

For counterbalancing the abutments at the ends of the rotor and mechanism associated with the power piston cylinder members a U-shaped eccentric counterbalance 150 is positioned adjacent the motor block head members 29. This counterbalance member 150 comprises a slot 151 in the upper end portion for retaining the pin 153 which is fitted in the outer casing head member 29, and relative movement of the counterbalance and pin is accommodated by the slot 151. In order to permit the passage of oil outward through the cylinder block adjacent the counterbalance 150 a narrow semi-circular sleeve portion 155 is provided to maintain the counterbalance and associated parts spaced from the oil bore opening 156. In this way oil from the interior crankshaft rotor is permitted to flow outward through the passageway 157 and opening 158 into the chamber provided by the pan, where it is recirculated through the motor parts.

The relative position of the compressor and power cylinders with the interconnecting valve controlled passageway between the cylinders provides a mechanism which can be readily modified so as to reverse the directional rotation of the engine rotor or drive shaft. To accomplish this the respective air compressor and power cylinder positions are reversed and air intake and exhaust valves are provided as required.

The sealing members on the rotor and abutments are held securely in position by the close fitting parts. In large engines the sealing members may be hydraulically locked in place before passing dead center position and released after passing dead center.

In operation the rotation of the rotor draws air into the compressor cylinder, compressing it, and thereafter the compressed air is transferred into the power cylinder adjacent thereto where fuel is injected into the high temperature compressed air and the gaseous mixture ignites and burns. This causes a rise in pressure in the power cylinder driving the piston drum around the cylinder rotating the crankshaft rotor of the engine. The compression discharge and fuel injection valves are adjusted to open and close at the proper time to give the maximum efficient operation of the motor.

It is understood that this invention is not limited to the details of construction shown but may be modified to accommodate varying conditions and uses without departing from the spirit of this invention.

Having thus fully described my invention, what I claim as new and desire to secure by Letters Patent is:

1. In a rotary internal combustion engine of the Diesel type, a casing having air compressing and power expending cylinder means formed therein; a crankshaft extending through said casing and transversely of said cylinders, drum shaped rotary pistons eccentrically mounted on said crankshaft and working in said cylinders, said pistons being arranged to rotate with said crankshaft and slidably engage the cylinder wall of their respective cylinders, each of said pistons having associated abutment means having extensions driven by said crankshaft and movable in sliding engagement with the periphery of said piston means for separating said cylinders into two compartments said abutment means each including an oscillating member having a slot and a sliding member slidably movable in the slot of said oscillating member, means comprising a passageway between said air compressing cylinder and power expending cylinder for conducting compressed air from said air compressing cylinder means into said power expending cylinder means, and valve means for controlling the passage of compressed air through said passageway, said abutment extensions being located adjacent to the side walls of said pistons, and said passageway being located between said pistons.

2. In a rotary internal combustion engine of the Diesel type, a casing having air compressing and power expending cylinder means formed therein, a crankshaft extending through said casing and transversely of said cylinders, drum shaped rotary pistons eccentrically mounted on said crankshaft and working in said cylinders, said pistons being arranged to rotate with said crankshaft and slidably engage the cylinder wall of their respective cylinders, each of said pistons having associated abutment means having extensions driven by said crankshaft and movable in sliding engagement with the periphery of said piston means for separating said cylinders into two compartments said abutment means each including an oscillating member having a slot and a sliding member slidably movable in the slot of said oscillating member, means comprising a passageway between said air compressing cylinder and power expending cylinder for conducting compressed air from said air compressing cylinder means into said power expending cylinder means, valve means for controlling the passage of compressed air through said passageway, means for operating said valve at a predetermined time during the rotation of said crankshaft, and means comprising a fuel nozzle operable for injecting fuel into said power expending cylinder, said abutment extensions being located adjacent to the side walls of said pistons, and said passageway being located between said pistons.

3. In a rotary internal combustion engine of the Diesel type, a casing having air compressing and power expending cylinder means formed therein, a crankshaft extending through said casing and transversely of said cylinder means, rotary pistons eccentrically mounted on said crankshaft and working in said cylinder means, said pistons being arranged to rotate with said crankshaft and slidably engage the circular wall of the said cylinder means, abutment means associated with said pistons and having extensions driven by said crankshaft for contacting the periphery of the piston means working in said cylinder means to separate the cylinder into two compartments said abutment means each including an oscillating member having a slot and a sliding member slidably movable in the slot of said oscillating member, means comprising a fluid passageway interconnecting said compressing and power cylinder means, valve means in said fluid passageway for controlling the passage of compressed air therethrough, and means comprising cam actuating mechanism driven by said crankshaft for operating said valve at a predetermined time during the rotation of said crankshaft, said abutment extensions being located adjacent to the side walls of said pistons, and said passageway being located between said pistons.

4. In a rotary internal combustion engine of the Diesel type, a casing having coaxially aligned cylinders formed therein, a crankshaft extending through said casing and transversely of said cylinders, drum shaped rotary pistons eccentrically mounted on said crankshaft and rotatable in said cylinders, said cylinders comprising air compressing and power expending piston cylinders, means comprising an abutment slidably associated with said piston means and having extensions driven by said crank shaft for separating the respective cylinders into two compartments during the rotary movement of said piston therein, said abutment means each including an oscillating member, a cylinder wall separating said cylinders, a passageway through said wall a valve in said passageway for controlling the passage of compressed air through said passageway, said extensions being located adjacent the side walls of said pistons and said passageway being located between said pistons.

5. In a rotary internal combustion engine of the Diesel type, a casing having coaxially aligned cylinders formed therein, a crankshaft extending through said casing and transversely of said cylinders, drum shaped rotary pistons eccentrically mounted on said crank shaft and rotatable in said cylinders, said cylinders comprising air compressing and power expending piston cylinders, means comprising an abutment slidably associated with said piston means and having extensions driven by said crankshaft for separating the respective cylinders into two compartments during the rotary movement of said piston therein, said abutment means each including an oscillating member, a cylinder wall separating said cylinders, a passagway through said wall a valve in said passageway for controlling the passage of compressed air through said passageway, said extensions being located adjacent the side walls of said pistons and said passageway being located between said pistons, and means for sealing said abutment means against the passage of fluid between said piston and the side walls of said cylinder.

6. In a rotary internal combustion engine of Diesel type, a casing having coaxially arranged fluid compressor and power expending cylinder means, a rotor including a crankshaft extending through said casing and transversely of said cylinder means, means comprising drum shaped pistons eccentrically mounted on said crankshaft and rotatable within said coaxially arranged cylinder means, means for conducting compressed fluid from said compressor cylinder into said power cylinder means, including a cylinder wall a passageway therethrough and a valve in said passageway, each of said pistons having associated abutment means, having extensions driven by said crank shaft, said abutment means each including an oscillating member having a slot, each abutment being slidable in the slot of an oscillating member, the said extensions being located adjacent the side walls of said pistons and said passageway being located between said pistons, and means comprising a fuel nozzle communicating with said power expending cylinder means for admitting fuel into said power cylinder to burn said compressed fluid conducted thereinto from said compressor cylinder means.

7. In a rotary internal combustion engine, a rotor casing comprising a compression cylinder and a combustion cylinder, a partition therebetween, said partition being provided with a passageway through which compressed gas from said compression cylinder is conducted into said combustion cylinder, a counterbalanced rotor shaft journaled in said rotor casing, drum shaped piston means eccentrically mounted on said rotor shaft and rotatable in said compression and combustion cylinders, an abutment means movable in each cylinder, each including an oscillating member having a slot and a sliding member slidable in said slot, each abutment having an extension journaled on said rotor shaft and reciprocable in each cylinder while in working engagement with the periphery of said drum shaped piston means, said rotor shaft being hollow and internally cooled by the circulation of oil therethrough, said extensions being located adjacent the side walls of said piston means and said passageway being located between said piston means.

8. In a rotary internal combustion engine, a rotor casing comprising compression cylinder and combustion cylinder means, a partition disposed between said compression and combustion cylinder means, said partition being provided with a valve controlled passageway for controlling the passage of compressed gas from said compression cylinder into said combustion cylinder, a rotor including a crankshaft extending through said cylinder means and coaxial therewith, drum shaped piston means eccentrically mounted on said crankshaft, said pistons being rotatable in engagement with the cylindrical walls of said cylinder means, abutment means having extensions driven by said crankshaft for dividing said cylinder means into two compartments, cam actuated mechanism driven by said crank shaft for actuating said valve to deliver compressed air to said power cylinder means, and means comprising a fuel nozzle for admitting fuel into said power cylinder means to ignite and burn said compressed air conducted thereinto from said compressor cylinder means, said abutment means each including an oscillating member having a slot, said sliding member slidingly engaging in said slot with the said extension being located adjacent the side walls of said piston means and said passageway being located between said piston means.

9. In a rotary internal combustion engine, a casing comprising air compressing cylinder and power expending combustion cylinder means, said cylinders being drum shaped and arranged tandem, a rotor crankshaft mechanism journaled in said casing and extending coaxially through said cylinder means, rotary piston means eccentrically mounted on said crankshaft and rotatable in said cylinder means, abutment means reciprocable through a slot in the cylinder wall of each cylinder and having a portion journaled on said crank shaft, said abutment portion including a fluid seal slidably engaging the periphery of said rotary piston means, said abutment means being operable to divide the space in said cylinder means into two variable sized compartments upon rotation of said piston means, said cylinders having a common wall a passageway extending through said wall, a valve in said passageway, said passageway being located between said abutment portions.

10. In a rotary internal combustion engine of the Diesel type the combination of a rotor comprising a crankshaft and eccentrically mounted cylindrical drum shaped rotary pistons, coaxially arranged cylinder means in which said pistons rotate, said cylinders comprising air compressing and combustion cylinder means, a partition between said air compressing and combustion cylinder means, fluid passageway means in said partition connecting said air compressing cylinder and combustion cylinder means, a valve in said passageway, means driven by said crankshaft for operating said valve to place said air compressing cylinder in communication with said combustion cylinder means at intervals during the rotation of said crankshaft, and fuel nozzle means associated with said combustion cylinder means and in communication therewith for introducing fuel into said combustion cylinder for burning in the compressed air admitted thereto whereby to effect the rotation of the piston in said combustion cylinder and air compressing cylinder to compress air and continue the cycle of operation, each of said partitions having an extension connected to and driven by said crank shaft, said fluid passageway means being located between said partition extensions.

11. In a rotary internal combustion engine, fluid compressor and power expending cylinder means arranged in tandem relationship, a rotor shaft extending through said cylinder means and coaxially therewith, rotary drum shaped pistons mounted on said shaft and rotatable in said cylinder means, abutment means having extensions by said crankshaft for dividing each cylinder means into two compartments, means comprising a valve controlled passageway for admitting compressed fluid to said power cylinder means at intervals, and means comprising a fuel nozzle means associated with said power cylinder for injecting fuel into said power cylinder means at intervals, said valve and fuel nozzle mechanism being controlled by cam actuated means driven by said rotor shaft, said passageway being located between said pistons, and between said abutment extensions.

12. In a rotary internal combustion engine of the Diesel type, a casing, cylinder means formed in said casing, certain of said cylinder means comprising air compressor cylinders and the remaining cylinders comprising combustion cylinders, a rotor including a crankshaft traversing said cylinders and coaxially positioned relative thereto, an eccentrically mounted drum shaped rotary piston means operable in said cylinder means, abutment means reciprocable in said cylinder means and associated with said piston means to divide said cylinder into two compartments, said abutment means each having an extension journaled on said crankshaft, and means for fluid sealing the outer walls of said abutment to said cylinder and said piston means, said abutment being provided with fluid passageways whereby cooling fluid can be circulated therethrough to cool said abutment, a fluid passageway means connecting each air compressor cylinder and combustion cylinder, said fluid passageway being located between a fluid compression cylinder and combustion cylinder and said extensions being located adjacent the side walls of said pistons, said passageway being located between each pair of extensions.

13. In a rotary internal combustion engine, a casing, air compressing and power expending cylinder means formed in said casing, a rotor including a crankshaft extending through said cylinder means and journaled in said casing, eccentrically mounted drum shaped rotary pistons carried by said crank shaft and rotatable in said cylinder means, abutment means mounted for reciprocation in said cylinder means and journaled on said crankshaft, and counterbalancing means for providing a balanced rotary mechanism in all positions of rotation, said counterbalancing means comprising eccentrically arranged members on said pistons and additional members associated with said abutment means for counterbalancing the rotating and reciprocating parts of said engine.

14. In a rotary internal combustion engine, the combination of means comprising a casing, air compressing and power expending cylinder means formed in said casing, a crank-shaft extending through said cylinder means and journaled in said casing, rotary drum shaped piston means carried by said crankshaft and operable in said cylinder means, said air compressing cylinder means having a passageway located between said cylinder and a power cylinder means for supplying compressed air to said power cylinder means, said air compressing rotary piston and power expending piston means being angularly positioned on said crankshaft 90 degrees apart whereby on rotation of said crankshaft in one direction air is initially compressed in said compression cylinder and thereafter delivered to said power expending cylinder, and means comprising a fuel nozzle for admitting fuel to said power cylinder to ignite and burn said compressed air, each of said rotary pistons having associated abutment means with extensions therefrom driven by said crank shaft, each fluid passageway being located between a pair of said extensions, each extension being adjacent the side walls of one of said pistons.

15. A rotary internal combustion engine of the Diesel type comprising air compressing and power expending cylinders arranged in a casing, a crankshaft rotor extending through said cylinders and coaxially arranged relative thereto, rotary piston means eccentrically arranged on said crankshaft and rotatable in said cylinder means, abutment means having an extension driven by said crankshaft and fluid sealed to the walls of said cylinder means and periphery of said piston means for dividing said cylinder means into two compartments, said crankshaft and abutment means comprising fluid passageways, and means for supplying oil under pressure through said fluid passageways and adjacent the point of contact with the piston and cylinder wall to cool and lubricate the same, an air passageway extending through a wall common to a pair of cylinders, a valve in said passageway said extensions being located adjacent the side walls of said pistons and said passageway being located between two of said extensions.

16. A rotary internal combustion engine of the Diesel type comprising a casing, a central opening therethrough, a rotor crankshaft mounted for rotation in said opening, said casing comprising cylinder means arranged coaxially of said crankshaft, drum shaped rotary piston means eccentrically mounted on said crankshaft rotatable in said cylinder means. certain of said cylinder and piston means comprising air compressing cylinders and other cylinders comprising fluid combustion power expending cylinders, abutment means driven by said crankshaft for dividing each cylinder means into two compartments, means comprising a fluid conduit through which the air compressed by said compression cylinder is delivered to said combustion power expending cylinder means, and valve means in said conduit for controlling the passage of compressed air to said power cylinder means, said rotor crankshaft and piston means being hollow for receiving cooling liquid under pressure for circulation through the working parts of said engine, said fluid conduit being located between a pair of said extensions.

17. A rotary internal combustion engine of the Diesel type comprising a casing, a central opening therethrough, a rotor crankshaft mounted for rotation in said opening, said casing comprising cylinder means arranged coaxially of said crankshaft, drum shaped rotary piston means eccentrically mounted on said crankshaft rotatable in said cylinder means, certain of said cylinder and piston means comprising air compressing cylinders and other cylinders comprising fluid combustion power expending cylinders, abutment means driven by said crankshaft for dividing each cylinder means into two compartments, means comprising a fluid conduit through which the air compressed by said compression cylinder is delivered to said combustion power expending cylinder means, valve means in said conduit for controlling the passage of compressed air to said power cylinder means, said rotor crankshaft and piston means being hollow for receiving cooling liquid under pressure for circulation through the working parts of said engine, and means comprising a fuel injector mechanism associated with said power cylinder means for injecting combustible fuel into said power cylinder for admixture with compressed air delivered thereinto from said air compression cylinder means, said fluid conduit being located between a pair of said extensions.

18. A rotary internal combustion engine of the compression-ignition type comprising a casing having air compressing and power expending cylinder means arranged therein, a rotor crankshaft journaled in said casing and extending coaxially through said cylinder means, drum shaped rotary piston means carried by said crankshaft and rotatable in said coaxially arranged cylinders, abutment means reciprocable in said cylinder means each abutment means having an extension driven by said crankshaft for dividing each cylinder chamber into two compartments, a partition between the said air compressing and power expending cylinders, a fluid passageway means in said partition interconnecting said air compressing cylinder means with said power cylinder means, a valve in said passageway for controlling the passage of compressed air therethrough, said rotor crankshaft and abutment means comprising channelways for receiving lubricating oil which is circulated under pressure to the channelways during the operation of said engine, said fluid conduit being located between a pair of said extensions.

19. In a rotary internal combustion engine of the Diesel type, the combination with a casing comprising a plurality of coaxially aligned cylinders, of a rotor crankshaft extending through said coaxially aligned cylinders, drum shaped rotary piston means eccentrically mounted on said crankshaft and rotatable in said cylinders, certain of said cylinders being arranged to compress air, abutment means reciprocable in said cylinders, each abutment means having an extension connected to and driven by said crank shaft means comprising a valve controlled passageway for conducting said compressed air into an adjacent power cylinder, means comprising a nozzle associated with said power cylinder through which fuel is injected for igniting and burning said compressed air delivered to said power cylinder from said compressing cylinder, and means driven by said crankshaft for operating said valve and fuel nozzle injecting means whereby compressed air is automatically discharged into said power cylinder means and subsequently ignited by the injection of fuel thereinto for operating the engine, said fluid conduit being located between a pair of said extensions.

JOSEPH N. WARNER.